United States Patent [19]
Sarda et al.
[11] Patent Number: 4,891,192
[45] Date of Patent: Jan. 2, 1990

[54] PROCESS FOR THE PURIFICATION OF TRACES OF RADIOACTIVE ELEMENTS GENERATED DURING THE STORAGE OF URANIUM RESULTING FROM THE REPROCESSING OF IRRADIATED NUCLEAR FUELS

[75] Inventors: Alain Sarda, St Saturnin les Avignon; Jean-Pierre Segaud, Orange, both of France

[73] Assignee: Uranium Pechiney, Courbevoie, France

[21] Appl. No.: 236,907

[22] Filed: Aug. 26, 1988

[30] Foreign Application Priority Data

Sep. 1, 1987 [FR] France ................................ 87 12705

[51] Int. Cl.[4] .......................... G21F 9/12; G21F 9/02; C01G 43/00; B01D 43/00

[52] U.S. Cl. .......................................... 423/6; 423/19; 252/627; 252/628; 252/629; 252/640; 210/682; 55/74; 55/98

[58] Field of Search ...................... 423/6, 19; 252/627, 252/628, 629, 640

[56] References Cited

U.S. PATENT DOCUMENTS

| | | | |
|---|---|---|---|
| 3,178,258 | 4/1965 | Cathers et al. . | |
| 3,925,536 | 12/1975 | Schuman | 423/258 |
| 3,978,194 | 8/1976 | Knudsen et al. | 423/261 |
| 4,031,029 | 6/1977 | Colter et al. | 423/19 X |
| 4,053,662 | 10/1977 | Bergez et al. | 427/250 |
| 4,522,794 | 6/1985 | Hochel et al. | 423/251 |
| 4,642,186 | 1/1987 | Nakamura | 252/631 X |

*Primary Examiner*—Brooks H. Hunt
*Assistant Examiner*—Virginia B. Caress
*Attorney, Agent, or Firm*—Dennison, Meserole, Pollack & Scheiner

[57] ABSTRACT

Process for the purification of reprocessing uranium from which have previously been separated the fission products generated in a nuclear reactor and consisting of eliminating the U232 daughter products appearing during storage, by passing said uranium in its hexafluoride form through a chemically inert porous material.

14 Claims, No Drawings

PROCESS FOR THE PURIFICATION OF TRACES OF RADIOACTIVE ELEMENTS GENERATED DURING THE STORAGE OF URANIUM RESULTING FROM THE REPROCESSING OF IRRADIATED NUCLEAR FUELS

TECHNICAL FIELD

The invention relates to a process for the purification of traces of elements, particularly radioactive elements generated during the storage of uranium resulting from the reprocessing of irradiated nuclear fuels.

PRIOR ART

Following combustion in a nuclear reactor, the uraniferous fuel is treated in a reprocessing plant where, after cooling, said irradiated fuel undergoes a succession of operations for selectively separating the uranium from the transuranium elements, including plutonium, and the fission products.

The uranium obtained in this way and separated from the nuclear reaction products is called reprocessing or ex-reprocessing uranium. It must be as pure as possible so that it can be reused in the conventional fuel cycle with a view to its reenrichment and reintroduction into a nuclear reactor. This advanced purification leads to a reprocessing uranium, whereof the radioactivity level in accordance with the specifications is low and permits its use under normal conditions. Prior to reuse, said uranium can be stored in the form of the hexahydrated nitrate, oxide, tetrafluoride, hexafluoride, etc.

However, this advanced chemical purification does not make it possible to eliminate the isotopes of the uranium and in particular the U232 $\alpha$-emitter, which remains in the state of traces, namely a few parts per billion (ppb) in the stored uranium and which is not in itself dangerous.

However, during storage, it generates disturbing related products, which by successive disintegrations of generally short periods give $\alpha$ and $\beta$ emitters, which finally lead to stable Pb 208.

This descent is successively constituted by: Th 228, Ra 224, Rn220, Po 216, Pb 212, Bi 212, Tl 208, Po 212, Pb 208. The periods range from 1 $\mu$s to several days and to 1.91 years for Th 228 and 72 years for U232. The most disturbing is Tl 208, which is a $\beta$-emitter and has a high $\gamma$ irradiating power (2.6 MeV). It becomes disturbing as soon as U232 has given rise to an adequate quantity of Th 228 and the daughter products of the latter have generated an adequate quantity.

Practically after two years storage half the equilibrium radioactivity is obtained. In absolute values, the radioactivity level reached is clearly dependent on the U232 quantity present in the initial reprocessing uranium. For example, a uranium having a content in U232 of 1.15 ppb/U after reprocessing and an activity of the daughter products of U232=100 Bq/g of U, has after storing for 3.25 years, an activity of 4000 Bq/g of U, which causes very serious problems for the user.

Thus, it is necessary to periodically eliminate the daughter products of U232 during prolonged storage in order to return the activity of the uranium to its initial value observed after reprocessing.

When reprocessing uranium is generally stored in the form of the solid nitrate, oxide or tetrafluoride, said periodic purification can take place by a treatment consisting of dissolving the stored product, then purifying the solution obtained by conventional means, such as resins, liquid-liquid exchange with solvents, selective precipitation, etc. prior to returning it to the stored form.

Apart from their complexity, these treatments suffer from the disadvantages of contaminating the installations, products or reagents used in a disturbing manner, whilst producing radioactive effluents which must be treated prior to discharge.

OBJECT OF THE INVENTION

The invention relates to a simple non-polluting process for the purification of reprocessing uranium, i.e. which has previously been freed from products of nuclear reactions, such as transuranium elements and fission products, said uranium having reached a high radioactivity as a result of a prolonged storage making it inappropriate for any form of storage or any use under normal protection conditions, said purification making it possible to reduce the radioactivity to very low values, e.g. less than a few hundred Bq/g of U, so that it is again possible to store and/or use the reprocessing uranium under normal conditions. It therefore aims at eliminating the traces of radioactive related products produced by the uranium 232 and supplying a reprocessing uranium which can be manipulated, used or again stored under conventional conditions not requiring heavy protection means.

Another object of the invention is to obtain a reprocessing uranium which can be directly used in an enrichment installation and/or an installation for the production of nuclear fuel.

When the uranium has to be stored for a long period, the inventive process makes it possible to recover said stock periodically in order to purify it in a simple and not very onerous manner before it reaches a prohibitive radioactivity level. Thus, this permits a further storage period under normal conditions, whilst waiting for a further purification operation according to the invention, or another use, also under normal radio protection and contamination conditions.

Another object of the invention is to provide a purification process for traces of radioactive related elements which can be easily realized in a non-polluting manner, the impurities being recovered in compact and non-scattered form, so that the storage thereof is easy, inexpensive and leads to no effluent production.

DESCRIPTION OF THE INVENTION

The invention is a process for the purification of reprocessing uranium from a uraniferous fuel which, as a result of a prior separation treatment, is free from elements generated during the passage of the uraniferous fuel in a nuclear reactor, said reprocessing uranium having been stored and during said storage having reached a sufficiently high radioactivity to prevent its use under normal conditions. The aim of the purification process is to eliminate the radioactivity due to the related products of the uranium 232 present and is characterized in that the reprocessing uranium is passed in its gaseous or liquid hexafluoride form through a chemically inert porous material.

Thus, the aim of the inventive process is to eliminate the related products or uranium 232, which appear during storage and which give rise to the radioactivity to be eliminated, when it becomes too high, e.g. higher than a value fixed by regulations.

The reprocessing uranium to be purified, after storage, is brought into the hexafluoride form using known processes, to the extent that it is stored in another chemical form. However, it is particularly advantageous to store it in hexafluoride form in the conventional containers provided for this purpose, so that the purification process according to the invention can then be applied in simple manner thereto.

The process consists of firstly having the hexafluoride under temperature and pressure conditions such that it is in the liquid or gaseous state. When it is stored in the container, it is sufficient for this purpose to heat the latter in an oven. The pressure must also have an adequately high value in order to then frontally pass the hexafluoride flow through a porous material contained in an inert confinement enclosure, maintained at the appropriate temperature by thermal insulation and/or heating. The purified flow leaving the porous material is either recovered in a water-cooled storage container, or is passed directly to a random transformation or use installation, e.g. enrichment, conversion, etc.

Such a treatment of all the hexafluoride flow differs from the isotopic enrichment of $UF_6$ occurring in enrichment plants by gaseous diffusion.

Thus, said process consists of passing a main $UF_6$ flow into porous tubes, called support tubes, which are internally covered with an asymmetrical barrier or active layer, the enrichment taking place as a result of the selective tangential extraction of the light isotopes of the $UF_6$ flow by diffusion through the barrier layer. The porous tube only serves as a support for the active layer and is not involved in the diffusion phenomenon. The active layer is asymmetrical, i.e. it is dense on the side in contact with the upstream $UF_6$ flow to enable the diffusion to take place and has a microporosity on the other side in contact with the support tube to favour the passage of the partly enriched, extracted $UF_6$. Thus, a $UF_6$ flow is introduced at one end of the porous tube, which is internally covered ith its active layer and whereof a light isotope-enriched part is extracted by diffusion through the active layer and whereof the larger remaining part passes out in depleted form at the other end of the tube. There is only a low pressure within the porous tube.

However, according to the invention, all the $UF_6$ flow passes frontally through the porous material, which is active, so that as a result the process is more a filtration than a diffusion, but the material does not act exclusively as a filter, as will be shown hereinafter.

The porous material can be constituted by cloths stacked on top of one another, the hexafluoride flow passing through them perpendicularly to the surface thereof, or by a cloth wound onto itself, the hexafluoride flow passing through it parallel to its winding axis. Said cloths must be chemically inert and must be able to resist the pressure and temperature conditions. They are preferably metallic, e.g. of the reps type. All inert metals can be used, e.g. steels and in particular stainless steels, nickel and alloys thereof, Inconel or better still Monel.

In the same way it is also possible to use all chemically inert, porous sintered materials, e.g. ceramics, such as alumina, nitrides, carbides, etc. or preferably metal. It is also possible to use fibre-based, sintered metallic belts, the metals which can be used being the same as those referred to hereinbefore.

The enclosure and the porous material must be chemically inert, e.g. they must be able to withstand the action of fluorine and its derivatives, HF fluorides, $UF_6$, etc. The corrosion thereof must be low so as to prevent the clogging of the porous material and the pollution of the hexafluoride discharged.

The weight quantity of the related products to be purified is minute and is virtually not dosable as such, in view of the very small uranium 232 quantity present at the outset (a few ppb). Therefore it must be ensured that the sampling for analysis is always representative. The analysis thereof generally takes place by the bias of their radioactivity and preferably on very large samples, or the complete hexafluoride used.

It is probable that most of these related products are in the form of solid or gaseous fluorides and in the case where they are in the form of particles of solid fluorides in liuqid or gaseous $UF_6$, they probably have a minute or molecular size, as a result of the in situ production method for said related products.

Thus, surprisingly, the porous material fixes all the related products, although its structure and cut off power can be chosen within a very wide range. In particular, the latter can be chosen within an extensive range, excessively low values reducing the possible hexafluoride flow rates for the same surface, whilst excessively high values require a greater porous material thickness.

In practice, with a view to obtaining a good purification efficiency, the equivalent diameter of the pores must be below 100 $\mu$m and preferably below 50 $\mu$m. This diameter is measured by bulloscopy according to ISO standard 4003-1977 (F).

In parallel, the thickness of the porous material is generally at least 100 mm in the case of a metallic fritted felt or cloth. In the case of fritted porous materials, the thickness is generally between 0.5 and 10 mm and preferably between 1.5 and 5 mm.

The passage speed of the liquid or gaseous hexafluoride is conventionally chosen below 250 meters per hour and is preferably between 15 and 100 m/h. The contact time with the porous material is conventionally above a few hundredths of a second and is preferably between 0.1 and 10 sec.

These parameters make it clear that the flow rates can be high, which is particularly interesting when using gaseous hexafluoride, whilst for a constant residence time or speed it is of greater interest to treat liquid hexafluoride.

It can be seen that it is also possible to treat large hexafluoride flow rates, using porous bodies, whereof the access surface is relatively small, e.g. for 500 kg of $UF_6$/hour a surface of approximately 0.5 $m^2$ can suffice, which illustrates the reduced overall dimensions of the purification apparatus.

The inventive process makes it possible to eliminate at least 98% of the radioactivity present in the starting hexafluoride and due to the uranium 232 related products, said purification generally being greater than 99.7%. These results are obtained by comparison before and after treatment either of the $\gamma$ irradiation measurements made in contact with the container or ducts, or preferably by spectrometry measurements of the complete container or a representative sample.

When the porous material is sufficiently contaminated by the products which it has fixed during the treatment, which is noted by measuring the irradiation in contact with its confinement enclosure, said enclosure and its porous material contained therein are then replaced by a new system. Due to its compactness, the system can easily be manipulated, even remotely, can be easily eliminated with a control discharge, as such or following conditioning, or can be stored in order to allow its radioactivity to decrease prior to reuse.

The process is applicable to reprocessing uranium with an isotopic uranium 235 content. It is of particular interest to perform it for enriched uranium, which is therefore also enriched in U232 and whereof the higher the U232 content, the shorter the low irradiation storage periods. It can be seen that the process is particularly simple and advantageous to perform when the reprocessing uranium is stored in the form of $UF_6$ and it permits its storage for very long periods, because it is merely necessary every so often to carry out a transfer from an emitter container to a receiver containter via a porous material according to the invention.

EXAMPLES

The following non-limitative examples provide a better understanding of the invention.

EXAMPE 1

The starting product is a reprocessing uranium hexafluoride stored in an aluminium-based alloy container, the receiver container being identical. The emitter container, which contains the product to be purified is connected to the purification apparatus, which is itself connected to the receiver container. These connections are of stainless steel and are provided with the necessary isolating or stop valves, as well as pressure gauges graduated from 0 to 6 bar located in the vicinity of the containers.

A primary vacuum pump is branched into said circuit and serves to eliminate the inert gases present in the circuit and the receiver container prior to the purification operation.

The receiver container is equipped with a water circulation, external cooling coil. It is installed on a weighing device, which makes it possible to follow the progress of the transfer.

The purification apparatus is constituted by a diameter 59 mm, stainless steel, cylindrical enclosure, at whose ends issue the tubes of the connections with the emitter and receiver containers. A diameter 50 mm porous material disk is positioned transversely in the enclosure. A differential pressure gauge gives the pressure drop between the upstream and downstream sides of the porous material. The emitter container and the purification apparatus are located in the same heating oven.

Different porous materials will be tested. In order to carry out the purification according to the invention, a vacuum is firstly formed in the installation in order to eliminate the inert gas. The oven is then heated, so that the emitter container is at approximately 80° C. and its pressure is stabilized. At the same time, the receiver container is cooled.

Once the pressures have been stabilized, the valves are manipulated so as to transfer the gaseous $UF_6$ through the porous material.

The hexafluoride decontamination is measured by comparisons of the radiochemical analysis of the activities of U232 daughter products performed on the starting $UF_6$ and the purified $UF_6$.

The purification rates, representing the relationship of these two measurements and obtained with the various porous materials used are given in the following table.

| Test No. | Porous material: Type | Porous material: Material | Thickness mm | Access surface cm² | Pore diameter µm | Gaseous flow: Flow rate kgUF6/h | Gaseous flow: Flux density kgUF6/hcm² | Gaseous flow: Gas velocity m/h | Emitter: Temperature °C. | Emitter: Pressure bar | Receiver: Temperature °C. | Receiver: Pressure bar | Purification rate % |
|---|---|---|---|---|---|---|---|---|---|---|---|---|---|
| 1 | sintered | incx | 2 | 20 | 50 | 1.2 | 0.06 | 50 | 80 | 1.8 | 17 | 1.8 | 99.6 |
| 2 | sintered | incx | 2 | 3 | 50 | 0.9 | 0.3 | 233 | 80 | 1.8 | 17 | 1.8 | 99.1 |
| 3 | Knitt pad | Monel s.s. | 2 | 20 | | 1.8 | 0.09 | 75 | 80 | 1.5 | 17 | 1.5 | 98.6 |
| 4 | sintered | Monel s.s. | 2 | 20 | 50 | 1.8 | 0.09 | 75 | 80 | 1.5 | 17 | 1.5 | 99.5 |

s.s = stainless steel

EXAMPLE 2

The installation used in this example makes it possible to treat cylinders containing up to 14 t of $UF_6$. It is similar to that of example 1, except the receiver container which is cooled by a water sprinkler system and the purification apparatus.

The latter is constituted by a cylindrical enclosure within which are arranged in parallel five identical porous material cartridges. They are cylindrical and sealed at one end. This arrangement makes it possible to increase the access surface to the porous material which, in this case, is 0.5 $m^2$, whilst retaining reduced overall dimensions of the enclosure, namely diameter 30 cm and volume 65 liters.

The porous material is sintered Monel metal, whereof the equivalent pore diameter is 50 $\mu m$, the useful thickness of each cartridge being 2 mm.

As hereinbefore, the $UF_6$ cylinder is heated to 80° C., the pressure in the emitter cylinder varying between 1.2 and 1.8 bar and that in the receiver cylinder between 0.6 and 1.2 bar during treatment. The gaseous $UF_6$ flow rate is varied between 57 and 331 kg/h for a total transferred quantity of 14 t of $UF_6$. The velocity was correlatively varied from 36 to 82 m/h and the residence time in the porous material from 0.6 to 0.26 sec.

Under these conditions, the purification rate obtained after counting the activity of the U232 daughter products carried out by $\gamma$ spectrometry of representative samples taken before and after treatment is 99.7%.

We claim:

1. Process for treating stored ex-reprocessing uranium containing trace amounts of fissionable U-232 which have given rise to radioactive daughter products, comprising converting ex-reprocessing uranium prior to storage or after storage to the hexafluoride form and passing said ex-reprocessing uranium in hexafluoride form in a gaseous or liquid state containing said daughter products through a chemically inert porous metal or sintered ceramic material, thereby removing said daughter products from said ex-reprocessing uranium, by fixing said daughter products in said metal or ceramic material.

2. Process according to claim 1, wherein the porous metal or ceramic material has an equivalent pore diameter below 100 μm.

3. Process according to claim 1 or 2, wherein the porous metal or ceramic material is sintered.

4. Process according to claim 3, wherein said sintered porous metal or ceramic material is a sintered metal.

5. Process according to claim 4, wherein the sintered metal is stainless steel, nickel or alloys thereof, or Monel metal.

6. Process according to claim 3, wherein the sintered porous metal or ceramic material has a thickness between 0.5 and 10mm.

7. Process according to claim 1 or 2, wherein the hexafluoride is treated in gaseous form.

8. Process according to claim 7, wherein the speed at which the gaseous hexafluoride is passed through the porous metal ceramic material is below 250 meters per hour.

9. Process according to claim 2, wherein said pore diameter is below 50 μm.

10. Process according to claim 6, wherein said thickness is between 1.5 and 5 mm.

11. Process according to claim 8, wherein said speed is between 15 and 100 meters per hour.

12. Process according to claim 1, wherein said converting takes place prior to storage of said ex-reprocessing uranium.

13. Process according to claim 1, wherein said converting takes place after storage of said ex-reprocessing uranium.

14. Process according to claim 1, wherein said radioactive daughter products are selected from the group consisting of Th 228, Ra 224, Rn 220, Po 216, Pb 212, Bi 212, Tl 208, Po 212 and mixtures thereof.

* * * * *